United States Patent
Morton (10) Patent No.: US 12,117,535 B2
(45) Date of Patent: Oct. 15, 2024

(54) DETECTION OF MULTIPLE SPOOFED OR FAULTY GLOBAL NAVIGATION SATELLITE SIGNALS

(71) Applicant: Honeywell International Inc., Charlotte, NC (US)

(72) Inventor: Blaise Morton, Minnetonka, MN (US)

(73) Assignee: Honeywell International Inc., Charlotte, NC (US)

( * ) Notice: Subject to any disclaimer, the term of this patent is extended or adjusted under 35 U.S.C. 154(b) by 358 days.

(21) Appl. No.: 17/569,330

(22) Filed: Jan. 5, 2022

(65) Prior Publication Data

US 2023/0213659 A1 Jul. 6, 2023

(51) Int. Cl.
*G01S 19/21* (2010.01)

(52) U.S. Cl.
CPC .................................. *G01S 19/215* (2013.01)

(58) Field of Classification Search
CPC .......................... G01S 19/215; G01S 19/00–55
See application file for complete search history.

(56) References Cited

U.S. PATENT DOCUMENTS

| | | | |
|---|---|---|---|
| 5,760,737 A | 6/1998 | Brenner | |
| 9,958,549 B2 | 5/2018 | Psiaki et al. | |
| 10,908,293 B2 | 2/2021 | Whitehead | |
| 10,983,220 B2 | 4/2021 | Ashjaee | |
| 10,996,345 B2 | 5/2021 | Brenner | |
| 2014/0292576 A1* | 10/2014 | Martin | G01S 19/215 342/357.59 |
| 2016/0377726 A1 | 12/2016 | Schipper et al. | |
| 2019/0317221 A1 | 10/2019 | Molina-Markham | |
| 2020/0103533 A1 | 4/2020 | Stein | |

(Continued)

FOREIGN PATENT DOCUMENTS

CN 109061683 A 12/2018

OTHER PUBLICATIONS

European Patent Office, "Extended European Search Report", from U.S. Appl. No. 17/569,330, filed May 17, 2023, from Foreign Counterpart to U.S. Appl. No. 17/569,330, filed May 17, 2023, pp. 1 through 11, Published: EP.

(Continued)

*Primary Examiner* — Cassi J Galt
(74) *Attorney, Agent, or Firm* — Fogg & Powers LLC (57) ABSTRACT

A system and method for detecting multiple spoofed or faulty global navigation satellite signals are provided. The system comprises a single antenna configured to receive satellite signals from a plurality of global navigation satellites, the single antenna located on a vehicle; a receiver in the vehicle, the receiver coupled to the single antenna; and at least one processor in the vehicle, the processor in communication with the single antenna through the receiver. The processor is operative to determine a unit vector in a direction from the vehicle to a global navigation satellite in local coordinates, from the satellite signals; determine a plurality of signal blocks, wherein the signal blocks are a collection of subsets of the satellite signals and a covariance matrix for the satellite signals; and determine which satellite signals in the signal blocks are spoofed or faulty by comparing a geometry of the local coordinates with satellite coordinates.

12 Claims, 2 Drawing Sheets

(56) References Cited

U.S. PATENT DOCUMENTS

2021/0157013 A1    5/2021    Lyusin
2021/0333415 A1    10/2021    Morton et al.

OTHER PUBLICATIONS

Brenner, Mats, "Integrated GPS/Inertial Fault Detection Availability", Navigation: Journal of the Institute of Navigation, vol. 43, No. 2, Summer 1996, Published: US.

Call, et al., "Performance of Honeywell's Inertial/GPS Hybrid (HIGH) for RNP Operations", IEEE, 0-7803-9454-2/06, 2006, pp. 244 through 255.

Colbourn, Charles J. et al., "Handbook of Combinatorial Designs", Second Edition, pp. Cover through Copyright page (7 pages) and pp. 35 through 58, CRC Press, Taylor and Francis Group LLC, 2007, Published: US.

Escher, et al., "GNSS/IRS Hybridization: Fault Detection and Isolation of More than One Rage Failure", Presented at Ion Gps, 2002, Portland, pp. 1 through 11, Published: US.

Giremus, et al., "A GLR Algorithm to Detect and Exclude up to Two Simultaneous Range Failures in a GPS/Galileo/IRS Case", ION GNSS 20th International Technical Meeting of the Satellite Division, Sep. 2007, pp. 2911-2923, Published: US.

Hall, Marshall, "Combinatorial Constructions", Studies in Mathematics, vol. 17, Studies in Combinatorics, pp. iv through vii and pp. 218 through 231, Mathematical Association of America, Published: US.

Pan, et al., "A Subset-Reduced Method for FDE ARAIM of Tightly-Coupled GNSS/INS", Sensors, 2019, vol. 19, 4847 pp. 1 through 19.

Vanderwerf, Kevin, "FDE Using Multiple Integrated GPS/Inertial Kalman Filters in the Presence of Temporally and Spatially Correlated Ionospheric Errors" ION GPS 0001, Sep. 2001, pp. 2676 through 2685, Published: US.

Wikipedia, "Paley Construction", https://en.wikipedia.org/wiki/Paely_construction, Page last edited on Mar. 15, 2021, pp. 1 through 4.

Zhang, et al., "Fast Multiple Fault Detection and Exclusion (FM-FDE) Algorithm for Standalone GNSS Receivers", IEEE Open Journal of the Communications Society, vol. 2, 2021, Jan. 8, 2021, pp. 217 through 234.

Hall, Marshall, "Generating Functions and Recursion", Combinatorial Theory, Second Edition, Wiley-Interscience Publication, Mar. 31, 1993, pp. 20 through 30.

European Patent Office, "Communication pursuant to Article 94(3)", from U.S. Appl. No. 17/569,330, filed Dec. 11, 2023, from Foreign Counterpart to U.S. Appl. No. 17/569,330, filed Dec. 11, 2023, pp. 1 through 8, Published: EP.

\* cited by examiner

DETECTION OF MULTIPLE SPOOFED OR FAULTY GLOBAL NAVIGATION SATELLITE SIGNALS

BACKGROUND

When global navigation satellite system (GNSS) signals are corrupted, such as through spoofing or faulty satellite transmissions, a vehicle navigation system that uses these GNSS signals is prone to determine incorrect navigation data for use by a vehicle. For example, when GNSS signals relied on by an aircraft are corrupted through spoofing, the aircraft navigation system that use these GNSS signals might determine an incorrect position or velocity state for the aircraft.

Some level of protection against corrupted GNSS signals has been previously implemented in various navigation systems, such as receiver autonomous integrity monitoring (RAIM). Such protection, however, does not extend much beyond detecting a single faulty signal from a single satellite.

SUMMARY

A system and method for detecting multiple spoofed or faulty global navigation satellite signals is described herein. The system comprises a single antenna configured to receive satellite signals from a plurality of global navigation satellites, the single antenna located on a vehicle; a receiver in the vehicle, the receiver coupled to the single antenna; and at least one processor in the vehicle, the at least one processor in communication with the single antenna through the receiver. The at least one processor is operative to determine a unit vector in a direction from the vehicle to a global navigation satellite in local coordinates, from the satellite signals; determine a plurality of signal blocks, wherein the signal blocks are a collection of subsets of the satellite signals and a covariance matrix for the satellite signals; and determine which satellite signals in the signal blocks are spoofed or faulty by comparing a geometry of the local coordinates with satellite coordinates.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for detection of multiple corrupted satellite signals, such as spoofed or faulty global navigation satellite system (GNSS) signals, is described herein.

The present system and method enhances protection against corrupted signals, such as from spoofing or faulty signals, by allowing detection of such corrupted signals from two or more satellites. This protection includes scenarios where an adversary intentionally sends multiple spoofed satellite signals that could cause an aircraft to fly toward a location of the adversary's choosing. The present approach will aid aircraft in identifying when multiple spoofed signals are encountered. This will provide improved safety, integrity, and continuity of aircraft using GNSS-based navigation systems.

In general, the present approach provides for selecting subsets of GNSS signals, to be processed in navigation filters such as Kalman filters, to allow multiple-signal failure identification and exclusion in a way that is more efficient than existing techniques.

In the conventional solution separation technique to enhance GNSS filter integrity, when N number of satellite signals are available, all of these signals are combined in a N-satellite filter to obtain a navigation solution; another N number of sub-filters is added, each of which uses only N−1 of the available signals; and the results of each of these sub-filters is compared with the results of the N-satellite filter. If one of the signals is faulty, the sub-filter that omits that signal will more likely have a correct solution with relatively small residual errors compared with the residuals of the other sub-filters.

An extension of the solution separation technique is to add another $$\frac{N(N-1)}{2}$$

sub-sub-filters, each of which uses all but two of the available signals. With these additional sub-sub filters, it should be possible to identify which pair of signals is faulty when exactly two signals are bad. However, when N is large the number of sub-sub-filters required for signal-pair failure detection can become quite large. When additional non-GNSS satellites are added to the mix, there could be 20 or more signals available at one time. It would be a gain in algorithmic efficiency to provide for signal failure identification with significantly fewer than $$\frac{N(N-1)}{2}$$

sub-sub-filters.

The present approach provides a technique for such signal failure identification. For example, when N number of satellite signals are available, the present method provides for determining which of the signals are bad (corrupted naturally) or spoofed (corrupted by an adversary), when assuming that no more than m number of signals are bad, where m≥2.

The benefits of the present method include simultaneous detection of up to two spoofed or faulty satellite signals using significantly fewer sub-sub-filters than prior approaches. In addition the present method provides the ability to detect simultaneously, three or more spoofed or faulty GNSS signals.

For example, when 10 GNSS satellites are available, prior methods require 10 sub-filters and 45 sub-sub-filters to identify at most two bad signals. By contrast, for the example of N=10 GNSS satellites, the present method can identify two bad signals using only 18 sub-sub-filters, as described further hereafter. Also, in the case of N=15 GNSS satellites, the present method can identify up to three bad signals using 42 sub-sub-filters, as described further hereafter. Prior approaches do not provide a method for identifying up to three bad signals out of 15 GNSS signals.

In general, the present method estimates a position solution, for a GNSS antenna, from messages in the satellite signals. No additional sensors or information is needed, other than a clock and processor (e.g., computer) to do calculations. The present method can consider at least five satellite signals at once to produce a warning that at least one of the five (or more) signals is bad. However, the present method does not provide information on which signal is bad by looking at only one set of signals, so there is a need to consider multiple sets of signals. In order to check that m or fewer (of the N) signals are bad, the present method provides an efficient way to pick the multiple sets of signals so it can be determined exactly which m (or fewer) signals are bad by knowing which sets contain at least one bad signal. For example, if there are at least five satellite signals, a warning can be given that at least one of the signals is bad, when a much different position solution is obtained based on a different subset of four signals used to do the computation.

While there are many ways to use the present approach to produce filters for a navigation system, there are two techniques that are particularly useful. The first of these is to use a combinatorial structure called Balanced Incomplete Block Design (BIBD), which have the Complementary Separability (CS) property. Briefly, a BIBD with the CS property will define a collection of sub-sub-filters having the desired properties to identify two bad satellite signals. The second of these techniques is the more general notion of the Complementary m-Separability (CmS) property, where m is any integer greater than 1. Briefly, for the CmS property, the integer m is the maximum number of bad signals that can be identified using a BIBD having that CmS property. An example for this case is m=3.

Using the two techniques above, there are multiple ways to produce filters having the desired properties for different numbers of satellite signals. For example, a single satellite signal can be removed from a BIBD having the CmS property. The resulting collection of sub-sub-filters will not have the same number of satellite signals in each sub-sub-filter, but the CmS property will remain intact.

Further details related to the system and method are described as follows and with reference to the drawings.

Figure 1:
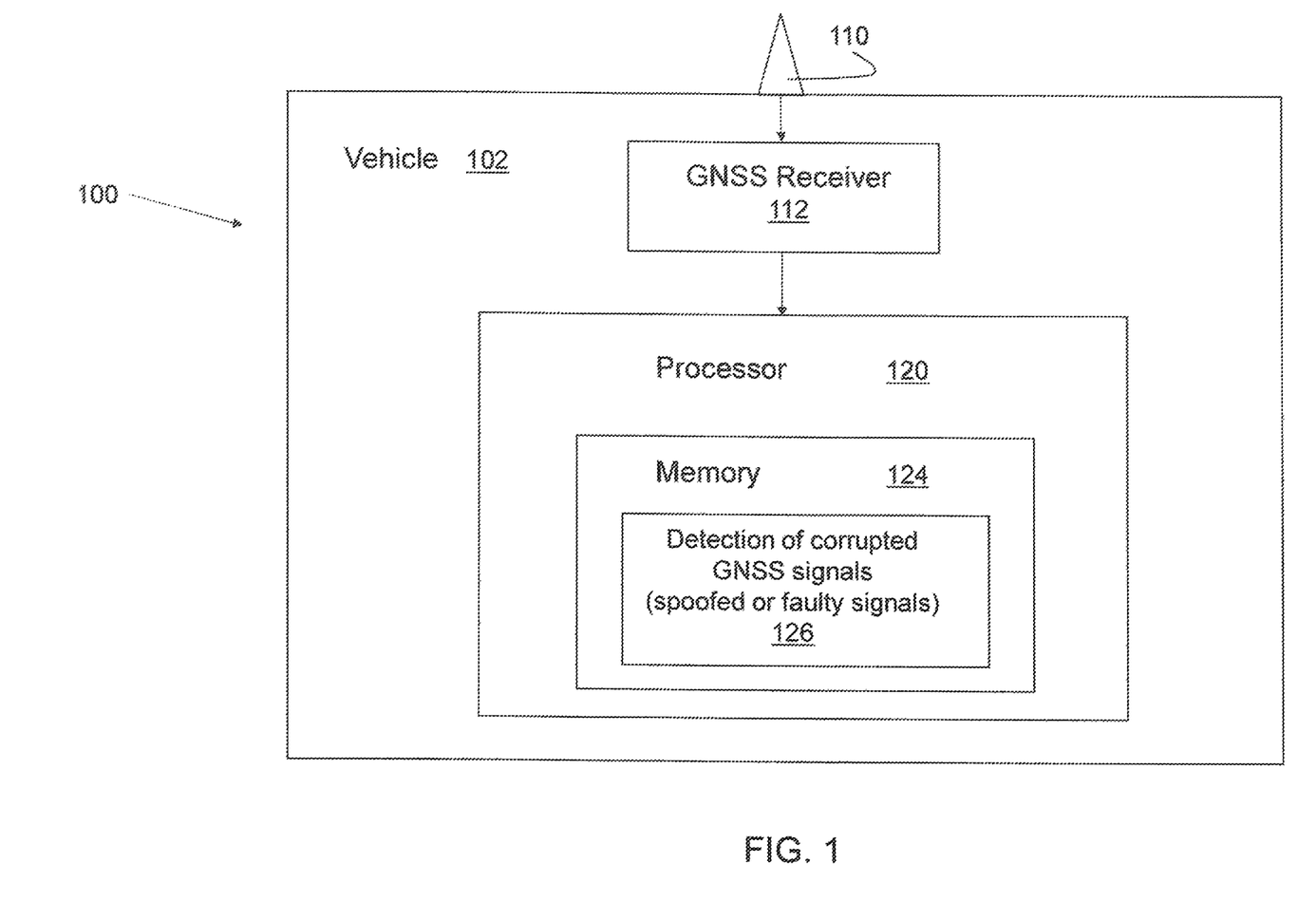
FIG. 1 is a block diagram of a system for detecting multiple corrupted global navigation satellite signals, such as spoofed or faulty satellite signals, according to one embodiment.

FIG. 1 is a block diagram of a system 100 for detecting multiple corrupted global navigation satellite signals, such as spoofed or faulty satellite signals, according to one embodiment. The system 100 comprises a single antenna 110 mounted on a vehicle 102, such as an aircraft, with antenna 110 configured to receive satellite signals from a plurality of global navigation satellites (not shown). A GNSS receiver 112 is located in vehicle 102 and is operatively coupled to antenna 110. At least one processor 120 located in vehicle 102 is in communication with antenna 110 through GNSS receiver 112.

The processor 120 is operative to execute processor readable instructions in a memory unit 124 to perform a method for detection of corrupted GNSS signals, such as spoofed or faulty signals (block 126). For example, when N number of the satellite signals are available, processor 120 is operative to assume that no more than m number of the satellite signals are spoofed or faulty, where N is greater than m. In one example, N is at least five satellite signals and m is at least two satellite signals.

Figure 2:
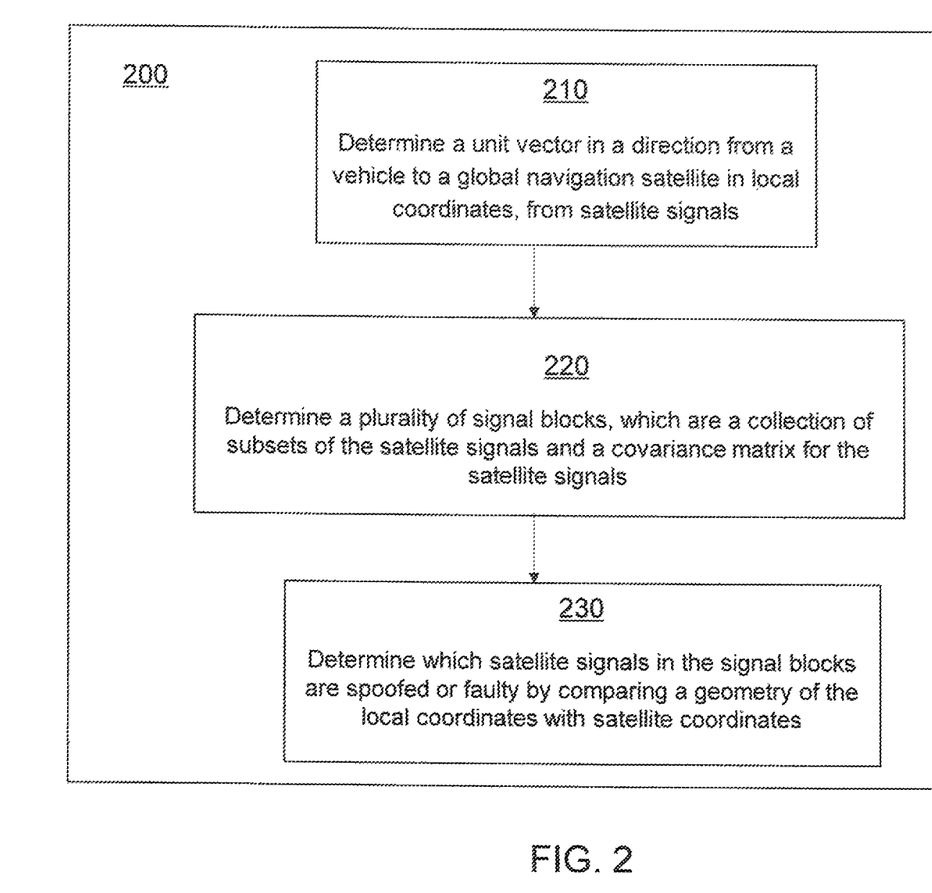
FIG. 2 is a flow diagram of an operational method for detecting multiple corrupted global navigation satellite signals, such as spoofed or faulty satellite signals, which can be implemented in the system of FIG. 1.

FIG. 2 is a flow diagram of an operational method 200 for detecting multiple corrupted global navigation satellite signals, such as spoofed or faulty satellite signals, which can be implemented by processor 120 of system 100 (FIG. 1). As depicted in FIG. 2, method 200 initially comprises determining a unit vector in a direction from a vehicle, such as vehicle 102 (FIG. 1), to a global navigation satellite in local coordinates, from the satellite signals (block 210). In one example implementation, determining the unit vector in the direction from the vehicle to the satellite comprises determining a position of the satellite using earth-centered-earth-fixed (ECEF) coordinates, and converting the ECEF coordinates to local north-east-down (NED) coordinates. The method 200 also determines a plurality of signal blocks, which are a collection of subsets of the satellite signals and a covariance matrix for the satellite signals (block 220). In one example implementation, every available satellite signal is included in at least one of the signal blocks, and each of the signal blocks are included in a balanced incomplete block design (BIBD). The method 200 then determines which satellite signals in the signal blocks are spoofed or faulty by comparing a geometry of the local coordinates with satellite coordinates (block 230).

As described in further detail hereafter, the BIBD can be defined by the symbols v, b, r, k, and 1, where: v is the number of available satellite signals; b is the number of the signal blocks; k is the number of satellite signals in each signal block; r is the number of times each satellite signal appears in the signal blocks; and λ is the number of times a pair of satellite signals appears together in a single signal block. In some embodiments, k has the same value for all signal blocks; r has the same value for each satellite signal; and λ has the same value for all pairs of satellite signals.

In one embodiment, when 10 satellite signals are available, the present method can determine that 2 of the satellite signals are spoofed or faulty, using only 18 sub-sub-filters in a navigation system of the vehicle. An example solution for this embodiment is listed in Table 1 below, which uses 18 sub-sub filters, each using 5 (of the 10) signals in a signal block. Here, the signal blocks have (v, k, λ)=(10, 5, 4) BIBD design, where: v (number of available satellite signals) is 10, k (number of satellite signals in each signal block) is 5, and λ (number of times a pair of satellite signals appears together in a single signal block) is 4. In addition, for this design, b (number of signal blocks) is 18, and r (number of times each satellite signal appears in the signal blocks) is 9.

TABLE 1

| Filter No. | Signal Blocks | | | | |
|---|---|---|---|---|---|
| 1 | 1 | 2 | 3 | 6 | 10 |
| 2 | 1 | 2 | 4 | 7 | 9 |
| 3 | 1 | 2 | 5 | 7 | 10 |
| 4 | 1 | 2 | 5 | 8 | 9 |
| 5 | 1 | 3 | 4 | 5 | 6 |
| 6 | 1 | 3 | 4 | 8 | 10 |
| 7 | 1 | 3 | 7 | 8 | 9 |
| 8 | 1 | 4 | 6 | 7 | 8 |
| 9 | 1 | 5 | 6 | 9 | 10 |
| 10 | 2 | 3 | 4 | 5 | 7 |

TABLE 1-continued

| Filter No. | Signal Blocks | | | | |
|---|---|---|---|---|---|
| 11 | 2 | 3 | 4 | 9 | 10 |
| 12 | 2 | 3 | 6 | 8 | 9 |
| 13 | 2 | 4 | 5 | 6 | 8 |
| 14 | 2 | 6 | 7 | 8 | 10 |
| 15 | 3 | 5 | 6 | 7 | 9 |
| 16 | 3 | 5 | 7 | 8 | 10 |
| 17 | 4 | 5 | 8 | 9 | 10 |
| 18 | 4 | 6 | 7 | 9 | 10 |

One general feature of the above solution in Table 1 is a high degree of symmetry. Each signal is used in 9 filters, and each pair of signals appears in 4 filters. For this design, when only a pair of signals is bad, the union of all signals in the good filters is the complement of the bad signal pair. For example, suppose {1,2} is the bad signal pair. For any other x, the pairs {1,x} and {2,x} appear in no more than 8 filters because 2=4, but x appears in 9 different filters, so one of those 9 filters must be good.

In contrast, the standard solution for the case of v=10 requires 45 sub-sub-filters, each one using 8 signals.

In another embodiment, when 9 satellite signals are available (v=9), the present method can determine that 2 of the satellite signals are spoofed or faulty, using only 18 sub-sub-filters in a navigation system of the vehicle. An example solution for this embodiment is listed in Table 2 below, which uses 18 sub-sub filters, each using 5 (of the 9) signals in a signal block.

TABLE 2

| Filter No. | Signal Blocks | | | | |
|---|---|---|---|---|---|
| 1 | 1 | 2 | 3 | 6 | 7 |
| 2 | 1 | 2 | 3 | 6 | 9 |
| 3 | 1 | 2 | 4 | 5 | 7 |
| 4 | 1 | 2 | 5 | 6 | 8 |
| 5 | 1 | 2 | 7 | 8 | 9 |
| 6 | 1 | 3 | 4 | 5 | 9 |
| 7 | 1 | 3 | 4 | 6 | 8 |
| 8 | 1 | 3 | 4 | 7 | 8 |
| 9 | 1 | 4 | 5 | 6 | 9 |
| 10 | 1 | 5 | 7 | 8 | 9 |
| 11 | 2 | 3 | 4 | 5 | 7 |
| 12 | 2 | 3 | 4 | 8 | 9 |
| 13 | 2 | 3 | 5 | 8 | 9 |
| 14 | 2 | 4 | 5 | 6 | 8 |
| 15 | 2 | 4 | 6 | 7 | 9 |
| 16 | 3 | 5 | 6 | 7 | 8 |
| 17 | 3 | 5 | 6 | 7 | 9 |
| 18 | 4 | 6 | 7 | 8 | 9 |

One general feature of the above solution in Table 2 is a high degree of symmetry. Each satellite signal is used in 10 filters, and each pair of signals appears in 5 filters. As a consequence of these symmetries, for each pair of signals there are 3 filters that do not use either one of them. Thus, for any pair of bad signals, the union of all signals in the 3 good filters is the complement of the bad signal pair.

In contrast, the standard solution for the case of v=9 requires 36 sub-sub-filters, each one using 7 signals.

In further embodiment, when 15 satellite signals are available (v=15), the present method can determine that up to 3 of the satellite signals are spoofed or faulty, using only 42 sub-sub-filters in a navigation system of the vehicle. An example solution for this embodiment is listed in Table 3 below, which uses 42 sub-sub filters, each using 5 signals in a signal block. Here, the signal blocks have (v, k, λ)=(15, 5, 4) BIBD design, where: v (number of available satellite signals) is 15, k (number of satellite signals in each signal block) is 5, and λ (number of times a pair of satellite signals appears together in a single signal block) is 4. In addition, for this design, b (number of signal blocks) is 42, and r (number of times each satellite signal appears in the signal blocks) is 14.

TABLE 3

| Filter No. | Blocks | | | | |
|---|---|---|---|---|---|
| 1 | 0 | 1 | 4 | 9 | 11 |
| 2 | 1 | 2 | 5 | 10 | 12 |
| 3 | 2 | 3 | 6 | 11 | 13 |
| 4 | 3 | 4 | 7 | 12 | 0 |
| 5 | 4 | 5 | 8 | 13 | 1 |
| 6 | 5 | 6 | 9 | 0 | 2 |
| 7 | 6 | 7 | 10 | 1 | 3 |
| 8 | 7 | 8 | 11 | 2 | 4 |
| 9 | 8 | 9 | 12 | 3 | 5 |
| 10 | 9 | 10 | 13 | 4 | 6 |
| 11 | 10 | 11 | 0 | 5 | 7 |
| 12 | 11 | 12 | 1 | 6 | 8 |
| 13 | 12 | 13 | 2 | 7 | 9 |
| 14 | 13 | 0 | 3 | 8 | 10 |
| 15 | 0 | 1 | 4 | 10 | 12 |
| 16 | 1 | 2 | 5 | 11 | 13 |
| 17 | 2 | 3 | 6 | 12 | 0 |
| 18 | 3 | 4 | 7 | 13 | 1 |
| 19 | 4 | 5 | 8 | 0 | 2 |
| 20 | 5 | 6 | 9 | 1 | 3 |
| 21 | 6 | 7 | 10 | 2 | 4 |
| 22 | 7 | 8 | 11 | 3 | 5 |
| 23 | 8 | 9 | 12 | 4 | 6 |
| 24 | 9 | 10 | 13 | 5 | 7 |
| 25 | 10 | 11 | 0 | 6 | 8 |
| 26 | 11 | 12 | 1 | 7 | 9 |
| 27 | 12 | 13 | 2 | 8 | 10 |
| 28 | 13 | 0 | 3 | 9 | 11 |
| 29 | 0 | 1 | 2 | 7 | x |
| 30 | 1 | 2 | 3 | 8 | x |
| 31 | 2 | 3 | 4 | 9 | x |
| 32 | 3 | 4 | 5 | 10 | x |
| 33 | 4 | 5 | 6 | 11 | x |
| 34 | 5 | 6 | 7 | 12 | x |
| 35 | 6 | 7 | 8 | 13 | x |
| 36 | 7 | 8 | 9 | 0 | x |
| 37 | 8 | 9 | 10 | 1 | x |
| 38 | 9 | 10 | 11 | 2 | x |
| 39 | 10 | 11 | 12 | 3 | x |
| 40 | 11 | 12 | 13 | 4 | x |
| 41 | 12 | 13 | 0 | 5 | x |
| 42 | 13 | 0 | 1 | 6 | x |

In one example implementation using the solution in Table 3, suppose signals 0, 1, x are bad (faulty or spoofed), then any sub-sub-filters not containing signals 0, 1, x are considered good. The good sub-sub filters can be identified in Table 3 as the rows for signal block numbers (filter numbers) 3, 8-10, 13, 2t-24, and 27.

In another example implementation using the solution in Table 3, suppose signals 4, 5, 7 are bad, then any sub-sub-filters not containing signals 4, 5, 7 are considered good. The good sub-sub filters can be identified in Table 3 as the rows for signal block numbers 3, 12, 14, 17, 25, 27, 28, 30, 37-39, and 42.

Prior approaches do not provide a method for identifying up to three bad signals out of 15 GNSS signals.

Using mathematical combinatorics it can be shown, under certain assumptions, how signal failure identification can be performed with significantly fewer sub-sub-filters. The main assumptions required are: for a specified number of input signals to a filter, if none of those signals is bad then that fact can be verified; and for that same number of input signals to a filter, if one of those signals is bad then that fact can be verified as well, though without knowing which signal(s) is (are) bad.

Under these two assumptions, what is described below will show how subsets of input signals can be defined, as inputs to a set of filters, to identify efficiently which of those signals is bad. Also, in the case a) where no signals are bad, and in the cases b) where one or two signals is (are) bad, in these two cases a) and b), at least one of the filters will have solutions generated from good signals, and it will be known which filters are using good signals. The mathematical objects involved in this approach are called balanced incomplete block designs (BIBDs), which are described in detail as follows.

Balanced Incomplete Block Design (BIBD)

As used herein, the term "block design" means a collection of subsets (called blocks) of signals selected from a larger set of available GPS (GNSS) signals. In a block design, every available signal is included in at least one of the blocks. The BIBDs are a special set of block designs that are used in the present method.

A BIBD starts with a finite set of signals and involves creating a collection of subsets of these signals that, when considered as a whole, has certain desired properties. As mentioned above, there are five different symbols that are standard in the description of a BIBD:

v=number of signals (total number available);
b=number of blocks (each subset in the BIBD is called a block);
k=number of signals in a block (k is the same for all blocks);
r=number of times each signal appears (r is the same for each signal);
$\lambda$=number of times a pair of signals appears together in a single block ($\lambda$ is the same for all pairs of signals).

The conditions that: a) all blocks have the same size, b) all signals appear the same number of times, and c) all pairs of signals appear in blocks together the same number of times, are what motivate the use of the term "balanced" in the name BIBD. These conditions impose nontrivial restrictions on the forms that BIBDs can take, as will be shown hereafter. The term "incomplete" in the name BIBD suggests that some blocks of size k chosen from the v available signals do not appear in the design, i.e., b<

$$\binom{v}{k},$$

and that is the case of concern here. By convention, the term "BIBD" does include the case where all $$\binom{v}{k}$$

subsets of size k are included.

For non-trivial BIBDs, where k>1, it can be concluded that there must be at least one pair of signals in each block. The balanced condition for pairs then implies that, for every pair of signals, there must be at least one block containing that pair. In addition, the five parameters v, b, k, r, and $\lambda$ satisfy two simple algebraic conditions:

$$bk=vr \quad (1)$$

$$r(k-1)=\lambda(v-1) \quad (2)$$

Both sides of equation (1) are the total number of signals (counted with multiplicity) in the BIBD. If the BIBD is considered in terms of its collection of subsets, the left-hand side gives that number because there are b blocks and each one contains k signals. If the BIBD is considered in terms of the signals involved, the right-hand side of equation (1) is the product of the number v of signals, and the number r of times each signal appears.

To verify equation (2), first note that a particular signal $s_1$ appears in exactly r different blocks, so the left-hand side of equation (2) is the total number of pairs of signals appearing in all the blocks for which $s_1$ is one signal in the pair. The right-hand side of equation (2) is the number of times each pair is found in a block, multiplied by (v−1)=number of pairs containing $s_1$. So the left and right sides of equation (2) are equal.

A set of parameters v, b, k, r and $\lambda$ satisfying equations (1) and (2) above is called admissible. However, not all admissible sets of parameters are associated with BIBDs.

It is a useful fact, from equations (1) and (2), that for any admissible set of five parameters (recall k>1), the three parameters (v, k, $\lambda$) determine the other two:

$$r = \frac{\lambda(v-1)}{k-1} \text{ and } b = \frac{vr}{k}.$$

The notation B(v, k, $\lambda$) is used to denote the associated BIBD, if it exists. The conditions that r and b are positive integers impose some divisibility conditions on the functions of (v, k, $\lambda$) on the right-hand side of these two equations.

The final basic property of BIBDs to note is that, for any BIBD B, the complementary block design B*, defined by taking as blocks the complements of the blocks in B, is a BIBD. The parameters of the complement are:

$$\text{Comp}(v,b,r,k,\lambda)=(v^*,b^*,r^*,k^*,\lambda^*)=(v,b,b-r,v-k,b-2r+\lambda) \quad (3)$$

One simple consequence of this fact is that, in a BIBD B with k≤v−2, for any pair of signals $s_1$, $s_2$ there is a block that contains neither one of them. The reason is that in B* we have k*=v−k≥2, so every block contains at least one pair of signals; hence, the pair of signals $s_1$, $s_2$ is in some block q* (by the balanced pair property) of B*, and so q=(q*)* (here * denotes complement) is a block in B that contains neither $s_1$ nor $s_2$.

Complementary Separability (CS)

A BIBD having the complementary separability (CS) property allows for identifying exactly which pair of signals is bad, when exactly two signals are bad, from the assumption that it is known which blocks have good signals. As used herein, a BIBD B with k≤v−2 has the CS property if and only if, for any pair of signals $s_1$, $s_2$, the union of all blocks containing neither signal has a complement that is exactly the set $\{s_1, s_2\}$.

For example, suppose there is a BIBD B with k≤v−2 and having the CS property. Assume the pair of signals $s_1$, $s_2$ (and only those) are bad. It is known that there is at least one block q in B containing neither $s_1$ nor $s_2$. Then, q* in B* has the property $\{s_1, s_2\}$ is a subset of q*. Now because B has the CS property, for any other signal $s_3$ it is known there is a block y* in B* containing $\{s_1, s_2\}$ that does not contain $s_3$. It immediately follows that the block y=y** in B contains $s_3$ but neither of $s_1$ nor $s_2$. The block y is therefore a good set. Because $s_3$ was an arbitrary signal not equal to $s_1$ nor to $s_2$, it follows that the union in B of all the good signal sets is equal to the complement of the set containing the two bad signals $\{s_1, s_2\}$. Thus, in a BIBD with the CS property, there is a constructive way to identify the two bad signals $\{s_1, s_2\}$ from knowledge of which blocks have only good signals. The method is to take the union u of all the good sets of signals in B, then the complement is the bad pair u*.

Incidence Matrices

Another concept that is needed in the construction of a BIBD collection is the incidence matrix A. Start by enumerating the signals $s_1, \ldots, s_v$ and the blocks $q_1, \ldots, q_b$. The incidence matrix $A=(a_{ij})$ is the v×b matrix such that $a_{ij}$ is 1 when $s_i$ is in $q_j$ and is 0 otherwise. Then the conditions satisfied by a BIBD with parameters (v, b, r, k, λ) can be written algebraically as follows:

$$AA^T = B = \begin{pmatrix} r & \lambda & \ldots & \lambda \\ \lambda & r & & \vdots \\ \vdots & & \ddots & \vdots \\ \lambda & & \ldots & r \end{pmatrix} = (r-\lambda)I_v + \lambda J_v \quad (4)$$

$$w_v A = k w_b \quad (5)$$

where $1_v$ is the identity matrix of size v, $J_v$ is the v×v matrix of 1's, and $w_v$, $w_b$ are the row vectors of v and b 1's, respectively.

There are three important facts to note regarding incidence matrices. The first fact is that any matrix A satisfying equations (4) and (5) above for positive integers (v, b, r, k, λ), for k<v, is the incidence matrix of a BIBD having those parameters. Equations (1) and (2) are automatically satisfied. So an incidence matrix satisfying the algebraic conditions and k<v is a sufficient condition for the existence of a BIBD with those parameters. The second fact is that for any BIBD B the complementary BIBD B*, with parameters as in equation (3), can be constructed from its incidence matrix A*=E−A, where E is the v×b matrix of 1's. The third fact concerns symmetric block designs, i.e., BIBDs for which v=b, r=k. In this case, the following facts are true: A is square, and $A^T A = A A^T$; the intersection of any two distinct blocks in the design contains exactly λ signals.

From these facts about symmetric designs, together with the general properties of BIBDs, the following can be shown. Given any block q in a symmetric BIBD B, the block design obtained by discarding all the signals in q from the other blocks in B (discard the block q as well) is a BIBD called the residual design. If B is a symmetric BIBD(v, k, λ), the residual design B' is a BIBD(v−k, k−λ, λ):

v'=v−k, k'=k−λ, λ'=λ, and $$r' = \frac{\lambda'(v'-1)}{k'-1} \text{ and } b' = \frac{v'r'}{k'} \quad (6)$$

where (v', b', r', k', λ') are the symbols of the residual design B'.

Hadamard Matrices

The next concept needed to build an example set of BIBDs is Hadamard matrices. A Hadamard matrix H of order m is an m×m matrix of 1's and −1's that satisfies the expression:

$$HH^T = mI. \quad (7)$$

It turns out that, for m>2, all Hadamard matrices are of the form m=4t, where t is a positive integer. Moreover, by right-multiplying and left-multiplying H by two appropriately chosen diagonal matrices having 1's and −1's on the diagonal, a normalized form for H can be assumed such that all entries in the first row and column are positive 1's.

From a normalized H of order m=4t, a BIBD can be constructed having v=4t−1, k=2t−1 and λ=t−1 as follows: discard the first row and column of H, and get an (m−1)×(m−1) matrix $C=(c_{ij})$; define the (m−1)×(m−1) matrix $A=(a_{ij})$ by putting $a_{ij}=1$ when $c_{ij}=1$ and $a_{ij}=0$ when $c_{ij}=-1$. It is easy to check that A satisfies:

$$AA^T = tI_v + (t-1)J_v \quad (8)$$

and in fact A is the incidence matrix of a symmetric BIBD having:

$$v=b=4t-1, r=k=2t-1, \text{ and } 2=t-1. \quad (9)$$

The BIBD associated with an A matrix having this form is called a Hadamard design or, for short, an H-design.

Example BIBDs from Hadamard Designs

The BIBDs associated with Hadamard matrices are symmetric designs, so they are associated with residual designs. Two types of BIBDs constructed from Hadamard designs include: 1) the BIBDs obtained by residualizing Hadamard designs for t=4, 5, 6, . . . ; 2) the BIBDs obtained by taking the complements of the residuals of the complements of the Hadamard designs for t=5, 6, 7, . . . . Designs of the type 1) provide collections of filters that work for even numbers of signals, while designs of the type 2) provide collections of filters that work for odd numbers of signals.

The parameters for the residual design B' of a general symmetric design appear in equation (6) above. To get formulas for the parameters of type 1) BIBDs, equation (6) is applied to the Hadamard design parameters in equation (9). The results are:

$$(v',b',r',k',\lambda')=(2t,4t-2,2t-1,t,t-1) \quad (10)$$

It is worth noting that for parameters as in equation (10) for t>1, k'=t and so 1<k'≤v'/2 (=2t/2), so these designs of type 1) have the CS property.

To get the parameters for type 2) BIBDs, first the parameters are computed for the complementary design of the H-design by applying the equations (3) to the formulas (9) to obtain:

$$(p^*,b^*,r^*,k^*,\lambda^*)=(4t-1,4t-1,2t,2t,1) \quad (11)$$

In residualizing the design, apply the equations (6) to the parameters in equation (11) to obtain:

$$(v^{*\prime},b^{*\prime},r^{*\prime},k^{*\prime},\lambda^{*\prime})=(2t-1,4t-2,2t,t,t) \quad (12)$$

Taking the complements of the parameters in equation (12) the following is obtained:

$$(v^{*\prime*},b^{*\prime*},r^{*\prime*},k^{*\prime*},\lambda^{*\prime*})=(2t-1,4t-2,2t-2,t-1,t-2) \quad (13)$$

The parameters in equation (13) are for the BIBD examples of the second type. Now k*'*=t−1 so for t>1, 1<k*'*≤v*'*/2=(2t−1)/2, and so these designs of type 2) have the CS property.

Note that, in both sets of examples for type 1) and type 2,) when there are a total of v signals available, each design uses roughly 2v filters, and each filter uses roughly v/2 of the available signals. This is more efficient than using the $$\binom{v}{2}$$

filters, each with v−2 of the available signals.

Complementary m-Separable BIBDs

A design is a pair (X, B) where X is a set of points and B is a collection of non-empty subsets of X. The subsets in B are called blocks. Let v, k and λ be integers such that v>k≥2. A (v, k, λ)-balanced incomplete block design (abbreviated (v, k, λ)-BIBD) is a design such that: X contains v points, each block contains exactly k points, and every pair of distinct points is contained in exactly 2 blocks.

Complementary 2-Separability (C2S) Property.

A (v, k, λ)-BIBD has the complementary 2-separability (C2S) property if and only if, for any pair of points i, j the union of all blocks not containing either point is the complement of the 2-point set (i.e. {i,j}) containing both. For example: let B=the set of all (v−2)-point subsets of X. Then (X, B) is a BIBD that has the C2S property, because for any i≠j there is only one (v−2)-point subset of X containing neither i nor j, and the complement of that subset is {i,j}.

The question can be asked: for general v>2, is there a way to construct BIBDs that have the C2S property and have linear growth in b=the number of subsets in B (so b≥av)? A partial answer to this question is: for 3<v<334, BIBDs can be constructed having the C2S property and b≤2v from Hadamard designs. If the Hadamard conjecture is true (i.e., Hadamard matrices exist of size 4p, for all p), the construction works for all v>3.

The C2S property can be generalized by defining the Complementary m-Separability (CmS) property, where m≥2. Let CmS mean that for any m-point subset S of X, m<v, the union of all blocks not containing any of the m points in S is exactly the complement of S.

Complementary m-Separability

The complete designs (where B contains all size-k subsets of X) for k=v−y, where y>1 is an integer, are CmS for all integers m≥y. Of course, there are many designs that do not have the CmS property for any integer m>1. The complete designs for k=v−1 are of this type.

To better describe the significance of the CmS property for general BIBDs, sufficient conditions can be stated for CmS in terms of the BIBD parameters v, k, λ, b and r, where $$b = \left(\frac{vr}{k}\right)$$

is the number of blocks, and $$r = \lambda\left(\frac{v-1}{k-1}\right)$$

is the number of blocks that contains any specified point. For example, a BIBD has the CmS property provided r>mλ. This can be shown by picking any m-point subset S of X, and letting z be any point of X not in S. For each s∈S, the pair s,z is contained in exactly 2 blocks in B. So at most mλ blocks in B contain both z and some point in S. But z is contained in r>mλ blocks in B. Therefore, z is in the union of all blocks that do not contain any points in S. Because z is general, it is known that all points not in S are in the union of blocks containing no points of S—this is the CmS property.

In addition, a corollary is that a BIBD has the CmS property provided v≥mk. This can be shown using the formula $$r = \lambda\left(\frac{v-1}{k-1}\right)$$

and observing that, when v≥mk, the quantity in parentheses is greater than m. This corollary is used in the next section for the case m=2, but first, it is a fact that given any BIBD (X, B), there is the complementary BIBD (X, B') where B' is the collection of subsets of X that are X-complements of the subsets in B. If the original BIBD has parameters v, k, λ, then the complementary BIBD has parameters v'=v, k'=v−k, λ'=b−2r+λ.

Special Case of m=2

Consider the special case m=2. When (X, B) does not have the C2S property, then v<2k. But then 2k'=2(v−k)=v+(v−2k)<v=v', so by the above corollary, (X, B') does have the C2S property. Thus, for any BIBD, either it or its complementary BIBD has the C2S property.

Because a BIBD is uniquely described by its complement, tables of BIBD parameters are typically written only for v≥2k. For example, see the table on pages 36-58 of Colburn, C. and J. Dinitz, *Handbook of Combinatorial Designs*, Taylor & Francis Group, CRC, $2^{nd}$ Edition, 2007, the disclosure of which is incorporated by reference. Admissible parameter sets for 1196 examples having r≤41 and k≤v/2 are recorded there. Some of those admissible sets do not correspond to BIBDs, but when they are BIBDs, those examples all have the C2S property.

Examples for m>2

The characterization of values v that have CmS BIBDs for m>2 is more complicated than the case m=2. For given m, other things being equal, the inequality r>ml is easiest to satisfy for BIBDs having λ=1. In this case, the infinite family of symmetric BIBDs is associated with projective planes, all of which have λ=1. For values of n>1 that are primes or powers of primes, there are BIBDs for which b=v=$n^2$+n+1, r=k=n+1 and λ=1. Thus, the projective-plane BIBDs of order n have the CmS property for all values 2≤m≤n.

Many non-symmetric CmS examples for m>2 also exist for the case λ=1, as can be found in the table on pages 36-58 of *Handbook of Combinatorial Designs* (e.g., example 2 in the table has (v, b, r, k, λ)=(9, 12, 4, 3, 1); example 14 has (v, b, r, k, λ)=(15, 35, 7, 3, 1)).

In the case λ=2 there is a (small) collection of symmetric BIBDs called biplanes. A biplane of order n has r=k=n+2 and b=v=1+(n+1)(n+2)/2. For biplanes with n>4, r>3λ=6, and the design is C3S. Some known examples in this case are for (v, k, λ)=(37, 9, 2), (56, 11, 2) and (79, 13, 2).

Non-symmetric CmS examples for m>2 and λ=2 can also be found in the table on pages 36-58 of *Handbook of Combinatorial Designs* (e.g., example 21 in the table has (v, b, r, k, λ)=(9, 24, 8, 3, 2); example 30 in the table has (v, b, r, k, λ)=(10, 30, 9, 3, 2)).

Bounding the Growth of b with v for CmS BIBDs

The approach to bounding the growth of b as a function of v begins by finding an appropriate collection of admissible parameter sets for each m. In the case of m=2, admissible parameter sets are found for all v>3, while for larger m such parameter sets are found only for special values of v>3. After finding admissible parameter sets, the approach is to construct example BIBDs that realize those parameters.

Special Case of m=2

In the case of m=2, the appropriate parameter sets are:
v even, (v, b, r, k, λ)=(2t, 4t−2, 2t−1, t, t−1) for t≥2
v odd, (v, b, r, k, λ)=(2t−1, 4t−2, 2t−2, t−1, t−2) for t≥3
In both cases it is easy to check the equations defining admissibility:

$$r = \lambda \left( \frac{v-1}{k-1} \right) \quad (14)$$

$$b = \left( \frac{vr}{k} \right) \quad (15)$$

For both even and odd v, for each t the above parameter sets come from residual and complementary designs associated with a symmetric Hadamard design having (v, b, r, k, λ)=(4t−1, 4t−1, 2t, 2t, t). These Hadamard designs are known to exist for t≤167. So for all v between 4 and 334, there are BIBDs that have the C2S property. For this family of BIBDs, the growth bound is b≤2v.

The admissible parameter sets above were found by performing constructions on Hadamard designs for H-matrices of size 4t, but it is possible to find these parameters directly without using the Hadamard heritage. The direct constructions follow.

When v is even, put v=2t and choose k=v/λ=t (so by the corollary, an associated BIBD is C2S). Then equation (1) above has the solution λ=k−1=t−1 and r=v−1=2t−1. Checking equation (2) above: b=2t(2t−1)/t=2(2t−1)<2v. So for even v, the C2S designs satisfy b≤2v.

When v is odd, put v=2t−1 and choose k=(v−1)/λ=t−1 (so by the corollary an associated BIBD is C2S). Then equation (1) above has the solution λ=k−1=t−2 and r=v−1=2t−2. Checking equation (2) above: b=(2t−1)(2t−2)/(t−1)=2(2t−1) =2v. So for odd v, the C2S designs satisfy b≤2v.

General Case of m>2

The general case of m>2 is more complicated, but a partial solution is obtained by generalizing the direct constructions shown at the end of the previous section. The path for the generalization is found by making the following observation: the construction of the above two families of appropriate parameter sets for m=2 was enabled by the basic fact that, for any integer v, either v is divisible by 2 or v−1 is divisible by 2. Guided by this observation, the special cases when m>2 that arise when v=mt or v=mt+1 can be considered.

In the case of direct construction for v=mt: choose k=v/m=t, (so by the corollary, an associated BIBD is CmS). Then equation (1) above has the solution λ=k−1=t−1 and r=v−1=mt−1. Checking equation (2) above: b=(mt)(mt−1)/t=m(mt−1)<mv. The parameters are: (v, b, r, k, λ)=(mt, m(mt−1), mt−1, t, t−1) for t≥2.

In the case of direct construction for v=mt+1: choose k=(v−1)/m=t (so by the corollary an associated BIBD is CmS). Then equation (1) above has the solution λ=k−1=t−1 and r=v−1=mt. Checking equation (2) above: b=(mt+1)(mt)/t=m(mt+1)=mv. The parameters are: (v, b, r, k, λ)=(mt+1, m(mt+1), mt, t, t−1) for t≥2.

In either case, whether v=mt or v=mt+1, there are admissible parameters of a BIBD (if such a BIBD exists) that has both the CmS property and satisfies b≤mv. For the case m=3 and values of t from 4 to 14 (associated with values of r from 11 to 41), the table on pages 36-58 of *Handbook of Combinatorial Designs* indicates that BIBDs exist for the admissible parameter sets obtained from the two direct constructions above.

For general m>2 and general v (not of the form mt or mt+1), the situation is more complicated but at least the following applies: if for some integer n>m, v=nt or v=nt+1, then the direct constructions give admissible parameters such that v≥nk (so a BIBD would be a CnS) and b≤nv. Such a BIBD would also be a CmS, but in this case the bound on b/v is weaker (i.e., larger). Alternatively, by allowing pairwise balanced designs (not all blocks have the same size) in place of BIBDs, CmS examples can be constructed for v=mt−c by removing c points (e.g., c<m−1) from a CmS BIBD for which v=mt. There is still a linear growth bound for b vs. v for these CmS BIBDs.

In various embodiments, the present system can be implemented in hardware devices with embedded software that can be connected securely to the cloud via wired or wireless connection. The processing units and/or other computational devices used in the method and system described herein may be implemented using software, firmware, hardware, or appropriate combinations thereof. The processing unit and/ or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a system for detecting multiple spoofed or faulty global navigation satellite signals, the system comprising: a single antenna configured to receive satellite signals from a plurality of global navigation satellites, the single antenna located on a vehicle; a receiver in the vehicle, the receiver coupled to the single antenna; and at least one processor in the vehicle, the at least one processor in communication with the single antenna through the receiver, the at least one processor operative to: determine a unit vector in a direction from the vehicle to a global navigation satellite in local coordinates, from the satellite signals; determine a plurality of signal blocks, wherein the signal blocks are a collection of subsets of the satellite signals and a covariance matrix for the satellite signals; and determine which satellite signals in the signal blocks are spoofed or faulty by comparing a geometry of the local coordinates with satellite coordinates.

Example 2 includes the system of Example 1, wherein determining the unit vector in the direction from the vehicle to the global navigation satellite in local coordinates comprises: determining a position of the satellite using earth-centered-earth-fixed (ECEF) coordinates; and converting the ECEF coordinates to local north-east-down (NED) coordinates.

Example 3 includes the system of any of Examples 1-2, wherein every available satellite signal is included in at least one of the signal blocks.

Example 4 includes the system of any of Examples 1-3, wherein each of the signal blocks are included in a balanced incomplete block design (BIBD).

Example 5 includes the system of Example 4, wherein the BIBD is defined by v, b, r, k, and $\lambda$, where: v is the number of available satellite signals; b is the number of the signal blocks; k is the number of satellite signals in each signal block; r is the number of times each satellite signal appears in the signal blocks; and $\lambda$ is the number of times a pair of satellite signals appears together in a single satellite block.

Example 6 includes the system of Example 5, wherein: k has the same value for all signal blocks; r has the same value for each satellite signal; and $\lambda$ has the same value for all pairs of satellite signals.

Example 7 includes the system of any of Examples 1-6, wherein when N number of the satellite signals are available, the at least one processor is operative to assume that m number of the satellite signals are spoofed or faulty, where N is greater than m, and N is at least five satellite signals and m is at least two satellite signals.

Example 8 includes the system of any of Examples 1-7, wherein when 10 satellite signals are available, the at least one processor is operative to determine that 2 of the satellite signals are spoofed or faulty, using 18 sub-sub-filters in a navigation system of the vehicle.

Example 9 includes the system of any of Examples 1-7, wherein when 15 satellite signals are available, the at least one processor is operative to determine that 3 of the satellite signals are spoofed or faulty, using 42 sub-sub-filters in a navigation system of the vehicle.

Example 10 includes the system of any of Examples 1-9, wherein the vehicle is an aircraft.

Example 11 includes a method for detecting multiple spoofed or faulty global navigation satellite system (GNSS) signals, the method comprising: receiving a plurality of GNSS signals, from a plurality of satellites, at a single antenna coupled to a GNSS receiver located in a vehicle; sending the received GNSS signals from the GNSS receiver to a processor in the vehicle, the processor operative to perform a method comprising: determining a unit vector in a direction of an associated satellite in local coordinates from the GNSS signals; determining a plurality of signal blocks, wherein the signal blocks are a collection of subsets of the GNSS signals and a covariance matrix for the GNSS signals; and determining which GNSS signals in the signal blocks are faulty by comparing a geometry of the local coordinates with satellite coordinates.

Example 12 includes the method of Example 11, wherein determining the unit vector in the direction from the vehicle to the global navigation satellite in local coordinates comprises: determining a position of the satellite using earth-centered-earth-fixed (ECEF) coordinates; and converting the ECEF coordinates to local north-east-down (NED) coordinates.

Example 13 includes the method of any of Examples 11-12, wherein every available satellite signal is included in at least one of the signal blocks.

Example 14 includes the method of any of Examples 11-13, wherein each of the signal blocks are included in a balanced incomplete block design (BIBD).

Example 15 includes the method of any of Examples 11-14, wherein when N number of the GNSS signals are available, the processor is operative to assume that no more than m number of the GNSS signals are faulty, where N is greater than m, and N is at least five GNSS signals and m is at least two GNSS signals.

Example 16 includes the method of any of Examples 11-15, wherein when 10 satellite signals are available, the processor is operative to determine that 2 of the satellite signals are spoofed or faulty, using 18 sub-sub-filters in a navigation system of the vehicle.

Example 17 includes the method of any of Examples 11-15, wherein when 15 satellite signals are available, the processor is operative to determine that 3 of the satellite signals are spoofed or faulty, using 42 sub-sub-filters in a navigation system of the vehicle.

Example 18 includes the method of any of Examples 11-17, wherein the vehicle is an aircraft.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system for detecting multiple spoofed or faulty global navigation satellite signals, the system comprising:
a single antenna configured to receive satellite signals from a plurality of global navigation satellites, the single antenna located on a vehicle;
a receiver in the vehicle, the receiver coupled to the single antenna; and
at least one processor in the vehicle, the at least one processor in communication with the single antenna through the receiver, the at least one processor operative to:
provide a plurality filters each including respective signal blocks, wherein the signal blocks are a collection of subsets of the satellite signals, and the signal blocks are included in a balanced incomplete block design (BIBD) having a Hadamard design, wherein the BIBD has a complementary 2-separability (C2S) property;
wherein when N number of the satellite signals are available, the at least one processor is operative to:
provide a b number of the signal blocks, where b is less than $N(N-1)/2$, and assume that there are no more than m number of spoofed or faulty satellite signals, where N is greater than m, and m is at least two satellite signals;
determine which of the b number of the signal blocks contain at least one spoofed or faulty signal;

identify good signal blocks by determining which of the b number of the signal blocks contain only good signals;

compute a union of the signals in the good signal blocks to determine a good signal subset; and compute a complement of the good signal subset to determine a candidate spoofed or faulty signal subset;

wherein if the number of signals in the candidate spoofed or faulty signal subset is less than or equal to m, then the candidate spoofed or faulty signal subset contains spoofed or faulty signals.

2. The system of claim 1, wherein every available satellite signal is included in at least one of the signal blocks.

3. The system of claim 1, wherein the BIBD is defined by v, b, r, k, and λ, where:

v is the number of available satellite signals;
b is the number of the signal blocks;
k is the number of satellite signals in each signal block;
r is the number of times each satellite signal appears in the signal blocks; and
λ is the number of times a pair of satellite signals appears together in a single satellite block.

4. The system of claim 3, wherein:

k has the same value for all signal blocks;
r has the same value for each satellite signal; and
λ has the same value for all pairs of satellite signals.

5. The system of claim 1, wherein when 10 satellite signals are available, the at least one processor is operative to determine that 2 of the satellite signals are spoofed or faulty, using 18 sub-sub-filters in a navigation system of the vehicle.

6. The system of claim 1, wherein when 15 satellite signals are available, the at least one processor is operative to determine that 3 of the satellite signals are spoofed or faulty, using 42 sub-sub-filters in a navigation system of the vehicle.

7. The system of claim 1, wherein the vehicle is an aircraft.

8. A method for detecting multiple spoofed or faulty global navigation satellite system (GNSS) signals, the method comprising:

receiving a plurality of GNSS signals, from a plurality of satellites, at a single antenna coupled to a GNSS receiver located in a vehicle; and sending the received GNSS signals from the GNSS receiver to a processor in the vehicle, the processor operative to perform a method comprising:

providing a plurality filters each including respective signal blocks, wherein the signal blocks are a collection of subsets of the GNSS signals, and the signal blocks are included in a balanced incomplete block design (BIBD) having a Hadamard design, wherein the BIBD has a complementary 2-separability (C2S) property;

wherein for N number of the GNSS signals, the processor performs a method comprising:

providing a b number of the signal blocks, where b is less than N(N−1)/2, and assuming that there are no more than m number of spoofed or faulty GNSS signals, where N is greater than m, and m is at least two GNSS signals;

determining which of the b number of the signal blocks contain at least one spoofed or faulty signal;

identifying good signal blocks by determining which of the b number of the signal blocks contain only good signals;

computing a union of the signals in the good signal blocks to determine a good signal subset; and computing a complement of the good signal subset to determine a candidate spoofed or faulty signal subset;

wherein if the number of signals in the candidate spoofed or faulty signal subset is less than or equal to m, then the candidate spoofed or faulty signal subset contains spoofed or faulty signals.

9. The method of claim 8, wherein every available GNSS signal is included in at least one of the signal blocks.

10. The method of claim 8, wherein when 10 GNSS signals are available, the processor is operative to determine that 2 of the GNSS signals are spoofed or faulty, using 18 sub-sub-filters in a navigation system of the vehicle.

11. The method of claim 8, wherein when 15 GNSS signals are available, the processor is operative to determine that 3 of the GNSS signals are spoofed or faulty, using 42 sub-sub-filters in a navigation system of the vehicle.

12. The method of claim 8, wherein the vehicle is an aircraft.

* * * * *